United States Patent
Sodagar

(10) Patent No.: US 11,822,555 B2
(45) Date of Patent: Nov. 21, 2023

(54) SIGNALING AND RESOLUTION MODEL FOR MULTI-LEVEL SESSION-BASED DESCRIPTION DESCRIPTORS

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 141 days.

(21) Appl. No.: 17/077,207

(22) Filed: Oct. 22, 2020

(65) Prior Publication Data

US 2021/0240715 A1  Aug. 5, 2021

Related U.S. Application Data

(60) Provisional application No. 62/969,294, filed on Feb. 3, 2020.

(51) Int. Cl.
*G06F 16/2455* (2019.01)
*G06F 16/242* (2019.01)
*H04L 67/02* (2022.01)

(52) U.S. Cl.
CPC ...... *G06F 16/24568* (2019.01); *G06F 16/242* (2019.01); *H04L 67/02* (2013.01)

(58) Field of Classification Search
CPC ... G06F 16/24568; G06F 16/242; H04L 67/02
See application file for complete search history.

(56) References Cited

U.S. PATENT DOCUMENTS

| | | | |
|---|---|---|---|
| 10,182,096 B1* | 1/2019 | Siddiqi | H04L 67/563 |
| 2003/0004960 A1* | 1/2003 | Pressmar | G06F 16/282 |
| 2008/0154828 A1* | 6/2008 | Antebi | G06F 16/2462 |
| | | | 706/46 |
| 2013/0238587 A1* | 9/2013 | Annau | G06F 16/3335 |
| | | | 707/708 |
| 2016/0261665 A1* | 9/2016 | Stockhammer | H04L 65/4069 |
| 2018/0006871 A1* | 1/2018 | Yang | H04L 41/0853 |
| 2018/0175955 A1* | 6/2018 | Kitazato | H04H 60/13 |
| 2021/0076081 A1* | 3/2021 | Huang | H04N 21/8456 |

OTHER PUBLICATIONS

ISO/IEC WD 23009-8: Part 8: Session-based DASH operations, ISO/IEC JTC 1/SC 29/WG 11 N18844 Geneva, CH—Oct. 2019, 21 pagess.

* cited by examiner

*Primary Examiner* — Allen S Lin
(74) *Attorney, Agent, or Firm* — Sughrue Mion, PLLC

(57) ABSTRACT

A method, computer program, and computer system is provided for signaling for session-based dynamic adaptive streaming over HTTP (DASH). Multiple queries at one or more elements of a Media Presentation Description are added. At least part of the multiple queries are replaced when building a Session-Based DASH query, whereby one or more query descriptors are added at the one or more elements of the Media Presentation Description. A relationship is determined between Session-Based DASH descriptors based on assigning values to the Session-Based DASH descriptors.

14 Claims, 6 Drawing Sheets

SIGNALING AND RESOLUTION MODEL FOR MULTI-LEVEL SESSION-BASED DESCRIPTION DESCRIPTORS

FIELD

This disclosure relates generally to field of data processing, and more particularly to media processing.

BACKGROUND

MPEG has recently started a new part in dynamic adaptive streaming over HTTP (DASH) standardization for Session-Based DASH Operation (ISO/IEC 23009-8). In such a session, while the Media Presentation Description (MPD) is generic for all clients, a client may get a side file, so call Session-Based Description (SBD), which provides instructions for the client to make MPD specific for that session.

SUMMARY

Embodiments relate to a method, system, and computer readable medium for signaling for session-based DASH. According to one aspect, a method for signaling for session-based DASH is provided. The method may include adding multiple queries at one or more elements of a Media Presentation Description. At least part of the multiple queries are replaced when building a Session-Based DASH query, whereby one or more query descriptors are added at the one or more elements of the Media Presentation Description. A relationship is determined between Session-Based DASH descriptors based on assigning values to the Session-Based DASH descriptors.

According to another aspect, a computer system for signaling for session-based DASH is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include adding multiple queries at one or more elements of a Media Presentation Description. At least part of the multiple queries are replaced when building a Session-Based DASH query, whereby one or more query descriptors are added at the one or more elements of the Media Presentation Description. A relationship is determined between Session-Based DASH descriptors based on assigning values to the Session-Based DASH descriptors.

According to yet another aspect, a computer readable medium for signaling for session-based DASH is provided. The computer readable medium may include one or more computer-readable storage devices and program instructions stored on at least one of the one or more tangible storage devices, the program instructions executable by a processor. The program instructions are executable by a processor for performing a method that may accordingly include adding multiple queries at one or more elements of a Media Presentation Description. At least part of the multiple queries are replaced when building a Session-Based DASH query, whereby one or more query descriptors are added at the one or more elements of the Media Presentation Description. A relationship is determined between Session-Based DASH descriptors based on assigning values to the Session-Based DASH descriptors.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Embodiments relate generally to the field of data processing, and more particularly to media processing. The following described exemplary embodiments provide a system, method and computer program to, among other things, provide a processing model for MPDs with multiple SBD descriptors.

As previously described, MPEG has recently started a new part in DASH standardization for Session-Based DASH Operation (ISO/IEC 23009-8). In such a session, while the Media Presentation Description (MPD) is generic for all clients, a client may get a side file, so call Session-Based Description (SBD), which provides instructions for the client to make MPD specific for that session. Session-Based DASH operation is an important approach to customize the MPD per session and possibly per client. However, the current design of Session-Based DASH specification has no clear rules for processing multiple SBD descriptors for the same MPD. It may be advantageous, therefore, to provide a processing model for multi-level SBD descriptor which results in a consistent and deterministic query generation enabling adding queries at multiple stages. The processing model allows the equivalence, addition, and replacement of queries depending on the relationship between the SBD descriptors.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

Figure 1:
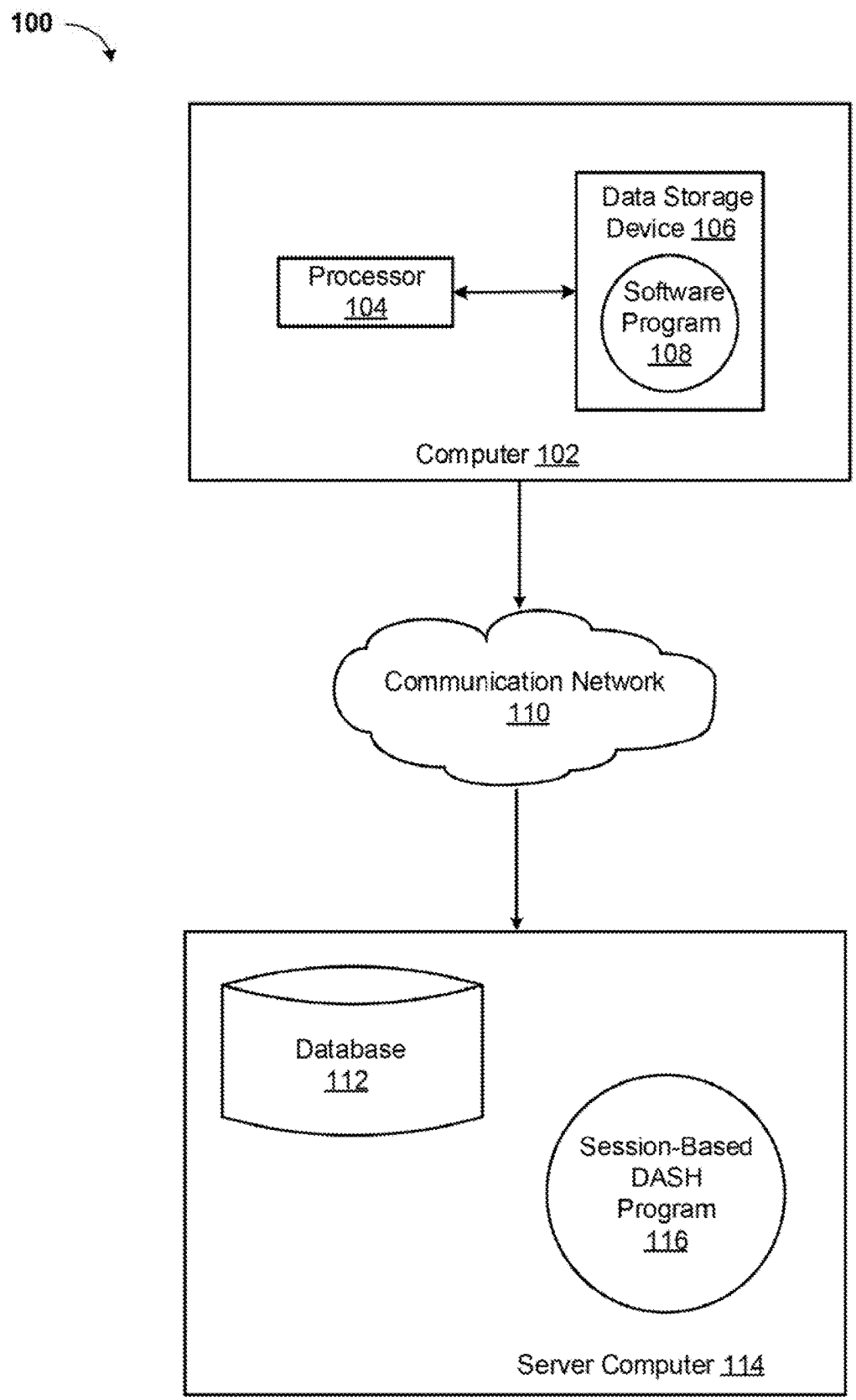
FIG. 1 illustrates a networked computer environment according to at least one embodiment.

Referring now to FIG. 1, a functional block diagram of a networked computer environment illustrating a Session-Based DASH system 100 (hereinafter "system") for providing signaling for session-based DASH. It should be appreciated that FIG. 1 provides only an illustration of one implementation and does not imply any limitations with regard to the environments in which different embodiments may be implemented. Many modifications to the depicted environments may be made based on design and implementation requirements.

The system 100 may include a computer 102 and a server computer 114. The computer 102 may communicate with the server computer 114 via a communication network 110 (hereinafter "network"). The computer 102 may include a processor 104 and a software program 108 that is stored on a data storage device 106 and is enabled to interface with a user and communicate with the server computer 114. As will be discussed below with reference to FIG. 4 the computer 102 may include internal components 800A and external components 900A, respectively, and the server computer 114 may include internal components 800B and external components 900B, respectively. The computer 102 may be, for example, a mobile device, a telephone, a personal digital assistant, a netbook, a laptop computer, a tablet computer, a desktop computer, or any type of computing devices capable of running a program, accessing a network, and accessing a database.

The server computer 114 may also operate in a cloud computing service model, such as Software as a Service (SaaS), Platform as a Service (PaaS), or Infrastructure as a Service (IaaS), as discussed below with respect to FIGS. 5 and 6. The server computer 114 may also be located in a cloud computing deployment model, such as a private cloud, community cloud, public cloud, or hybrid cloud.

The server computer 114, which may be used for compressing a neural network model is enabled to run a Session-Based DASH Program 116 (hereinafter "program") that may interact with a database 112. The Session-Based DASH Program method is explained in more detail below with respect to FIG. 3. In one embodiment, the computer 102 may operate as an input device including a user interface while the program 116 may run primarily on server computer 114. In an alternative embodiment, the program 116 may run primarily on one or more computers 102 while the server computer 114 may be used for processing and storage of data used by the program 116. It should be noted that the program 116 may be a standalone program or may be integrated into a larger Session-Based DASH program.

It should be noted, however, that processing for the program 116 may, in some instances be shared amongst the computers 102 and the server computers 114 in any ratio. In another embodiment, the program 116 may operate on more than one computer, server computer, or some combination of computers and server computers, for example, a plurality of computers 102 communicating across the network 110 with a single server computer 114. In another embodiment, for example, the program 116 may operate on a plurality of server computers 114 communicating across the network 110 with a plurality of client computers. Alternatively, the program may operate on a network server communicating across the network with a server and a plurality of client computers.

The network 110 may include wired connections, wireless connections, fiber optic connections, or some combination thereof. In general, the network 110 can be any combination of connections and protocols that will support communications between the computer 102 and the server computer 114. The network 110 may include various types of networks, such as, for example, a local area network (LAN), a wide area network (WAN) such as the Internet, a telecommunication network such as the Public Switched Telephone Network (PSTN), a wireless network, a public switched network, a satellite network, a cellular network (e.g., a fifth generation (5G) network, a long-term evolution (LTE) network, a third generation (3G) network, a code division multiple access (CDMA) network, etc.), a public land mobile network (PLMN), a metropolitan area network (MAN), a private network, an ad hoc network, an intranet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of system 100 may perform one or more functions described as being performed by another set of devices of system 100.

Figure 2:
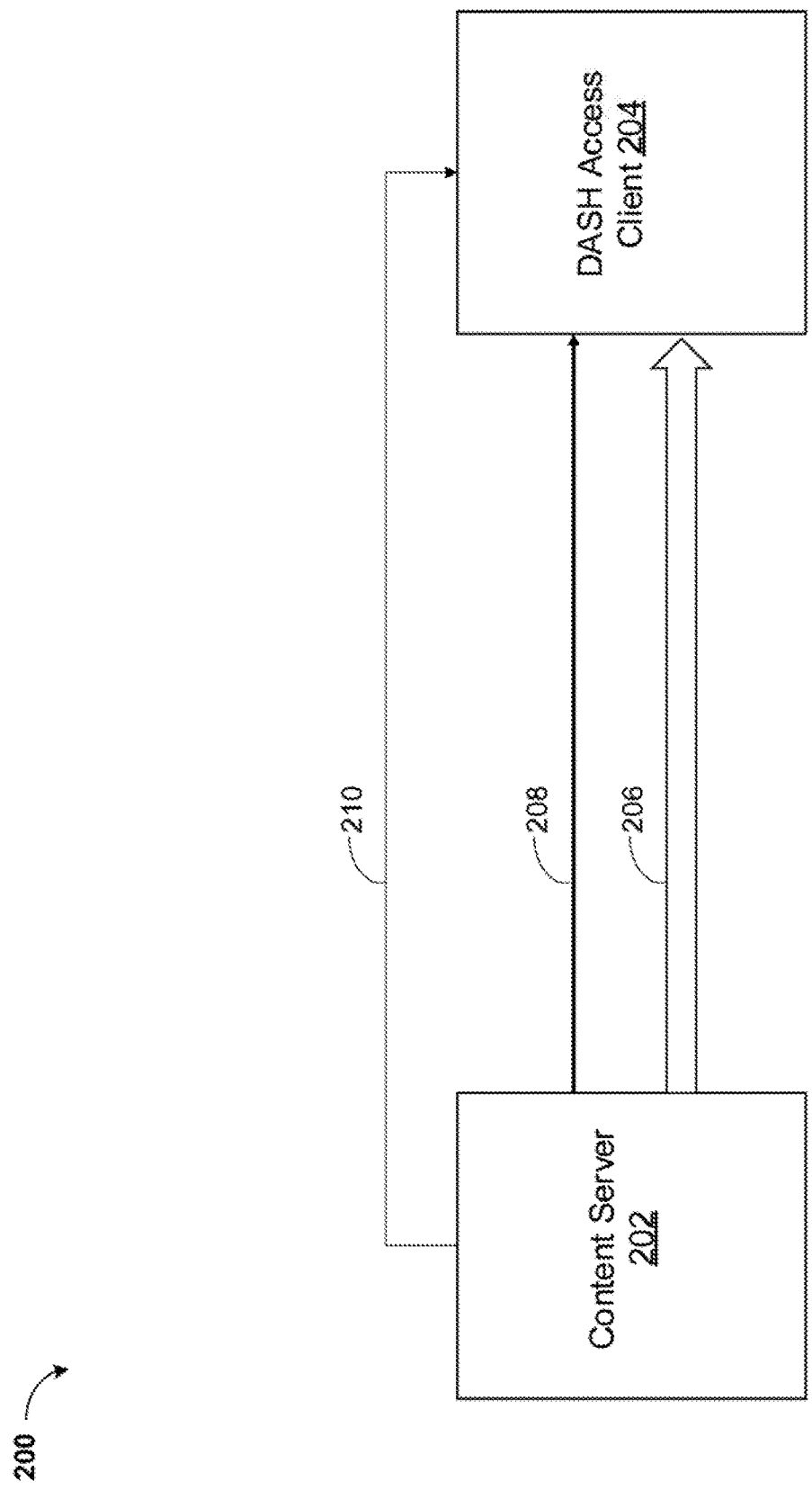
FIG. 2 is a block diagram of a Session-Based DASH operation system, according to at least one embodiment.

Referring now to FIG. 2, a block diagram of a Session-Based DASH operation system 200 is depicted. The Session-Based DASH operation system 200 may include a content server 202, a DASH access client 204, a media segment data link 206, a common MPD data link 208, and a session based description data link 210. An SBD descriptor may appear at different levels, such as MPD, adaptation set, representation, and subrepresentation. Each SBD descriptor may define a URL of the SBD file, a set of keys to be added to query in certain order, and the default values for those keys.

The equivalency property between two or more SBD descriptors may be defined as when the descriptors of the same element have identical values in their @schemeIdUri, @value, and @id attributes respectively. According to the DASH specification, when two or more descriptors are equivalent, then the processing of any of them is adequate. An SBD descriptor may be defined to be replacing the descriptor for another (replaced) SBD descriptor at the higher hierarchical level if the SBD descriptors have identical corresponding values in their @schemeIdUri and @id attributes. A replacing descriptor query replaces the query of the replaced descriptor in the exact same location of replaced query.

Two or more SBD descriptors are called additive if either @id are not identical. Each additive SBD descriptor adds to a new query substring to the end of the query string generated by the older SBD descriptor. An older descriptor is an SBD descriptor that appears first at the same element or appears in the parental elements in the hierarchical data model.

The processing model of SBD descriptors may include the SBD descriptor appearing at one or more levels for the MPD hierarchical data model, one or more times. If at one MPD element, two or more SBD descriptors appear that are equivalent, i.e. have identical values in their @schemeIdUri, @value, and @ id attributes respectively, then a DASH client may process only one of the descriptors. If at two different levels of an MPD hierarchical data model, two SBD descriptors appear that have identical values @id attributes, the SBD descriptor of the element at lower hierarchical level takes the precedence and only the key-value pairs defined by that descriptor are expected to be added to the queries at the exact location of the query of the higher level SBD descriptor. If at the same level or two or more different levels of an MPD hierarchical data model, two or more SBD descriptor appear with different @id values, the key-value pairs are expected to be added to the query in the order of appearance in each element and high to low level in the MPD hierarchical data model.

Figure 3:
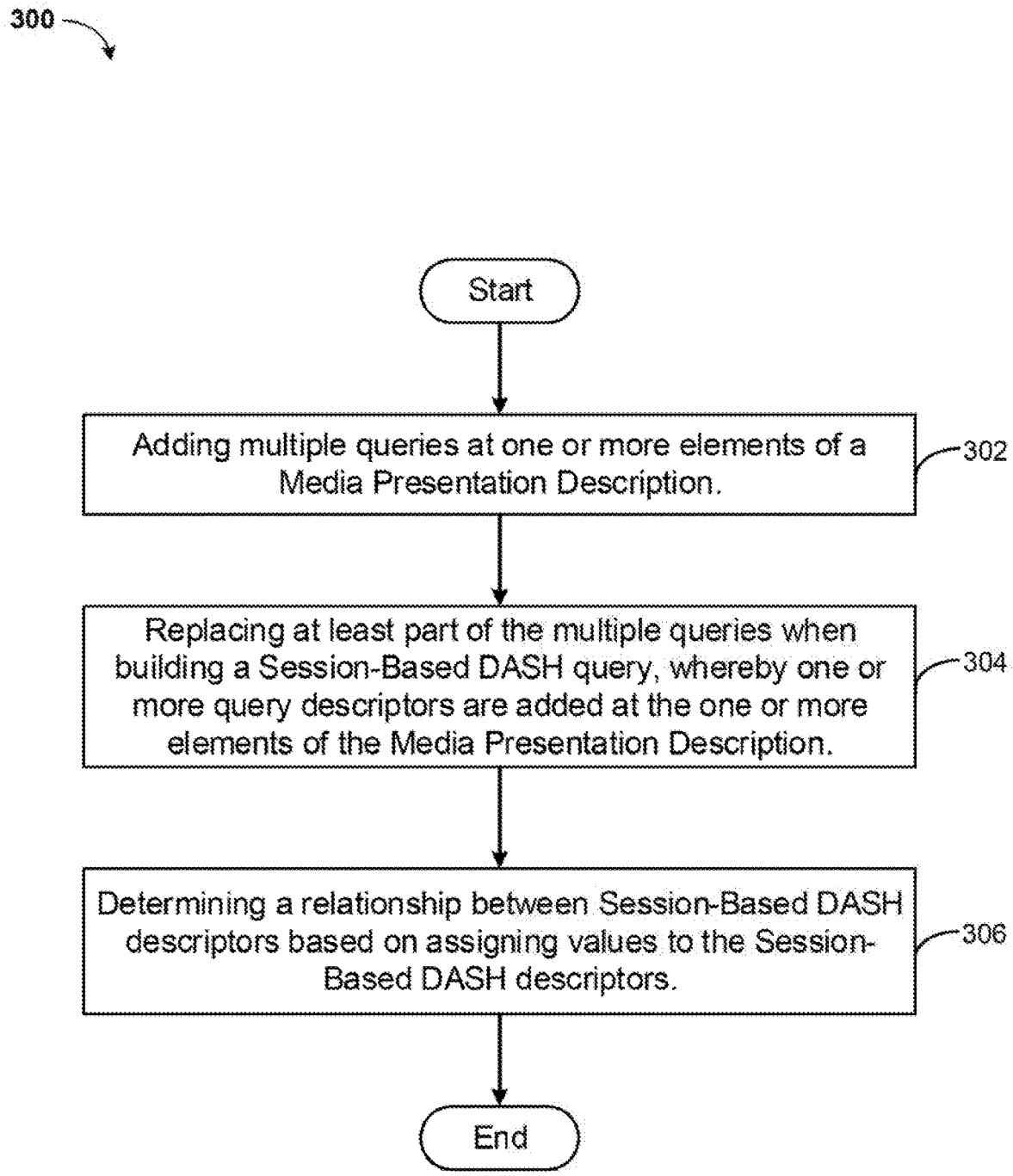
FIG. 3 is an operational flowchart illustrating the steps carried out by a program that provides signaling for Session-Based DASH, according to at least one embodiment.

Referring now to FIG. 3, an operational flowchart illustrating the steps of a method 300 for providing signaling for Session-Based DASH is depicted. In some implementations, one or more process blocks of FIG. 3 may be performed by the computer 102 (FIG. 1) and the server computer 114 (FIG. 1). In some implementations, one or more process blocks of FIG. 3 may be performed by another device or a group of devices separate from or including the computer 102 and the server computer 114.

At 302, the method 300 includes adding multiple queries at one or more elements of a Media Presentation Description.

At 304, the method 300 includes replacing at least part of the multiple queries when building a Session-Based DASH query. One or more query descriptors are added at the one or more elements of the Media Presentation Description.

At 306, the method 300 includes determining a relationship between Session-Based DASH descriptors based on assigning values to the Session-Based DASH descriptors.

It may be appreciated that FIG. 3 provides only an illustration of one implementation and does not imply any limitations with regard to how different embodiments may be implemented. Many modifications to the depicted environments may be made based on design and implementation requirements.

Figure 4:
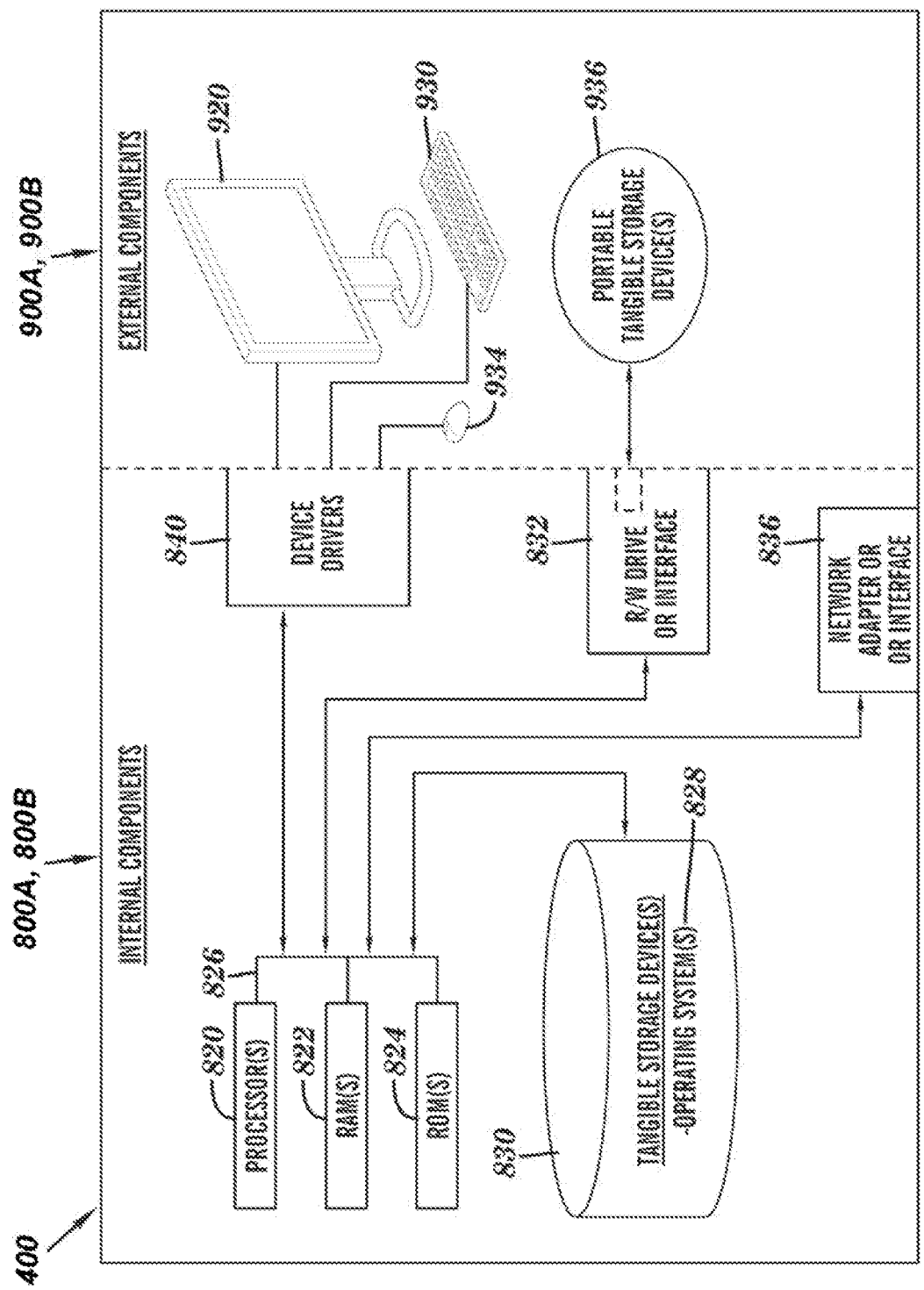
FIG. 4 is a block diagram of internal and external components of computers and servers depicted in FIG. 1 according to at least one embodiment.

FIG. 4 is a block diagram 400 of internal and external components of computers depicted in FIG. 1 in accordance with an illustrative embodiment. It should be appreciated that FIG. 4 provides only an illustration of one implementation and does not imply any limitations with regard to the environments in which different embodiments may be implemented. Many modifications to the depicted environments may be made based on design and implementation requirements.

Computer 102 (FIG. 1) and server computer 114 (FIG. 1) may include respective sets of internal components 800A,B and external components 900A,B illustrated in FIG. 4. Each of the sets of internal components 800 include one or more processors 820, one or more computer-readable RAMs 822 and one or more computer-readable ROMs 824 on one or more buses 826, one or more operating systems 828, and one or more computer-readable tangible storage devices 830.

Processor 820 is implemented in hardware, firmware, or a combination of hardware and software. Processor 820 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Bus 826 includes a component that permits communication among the internal components 800A,B.

The one or more operating systems 828, the software program 108 (FIG. 1) and the Session-Based DASH Program 116 (FIG. 1) on server computer 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory, an optical disk, a magneto-optic disk, a solid state disk, a compact disc (CD), a digital versatile disc (DVD), a floppy disk, a cartridge, a magnetic tape, and/or another type of non-transitory computer-readable tangible storage device that can store a computer program and digital information.

Each set of internal components 800A,B also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the software program 108 (FIG. 1) and the Session-Based DASH Program 116 (FIG. 1) can be stored on one or more of the respective portable computer-readable tangible storage devices 936, read via the respective R/W drive or interface 832 and loaded into the respective hard drive 830.

Each set of internal components 800A,B also includes network adapters or interfaces 836 such as a TCP/IP adapter cards; wireless Wi-Fi interface cards; or 3G, 4G, or 5G wireless interface cards or other wired or wireless communication links. The software program 108 (FIG. 1) and the Session-Based DASH Program 116 (FIG. 1) on the server computer 114 (FIG. 1) can be downloaded to the computer 102 (FIG. 1) and server computer 114 from an external computer via a network (for example, the Internet, a local area network or other, wide area network) and respective network adapters or interfaces 836. From the network adapters or interfaces 836, the software program 108 and the Session-Based DASH Program 116 on the server computer 114 are loaded into the respective hard drive 830. The network may comprise copper wires, optical fibers, wireless transmission, routers, firewalls, switches, gateway computers and/or edge servers.

Each of the sets of external components 900A,B can include a computer display monitor 920, a keyboard 930, and a computer mouse 934. External components 900A,B can also include touch screens, virtual keyboards, touch pads, pointing devices, and other human interface devices. Each of the sets of internal components 800A,B also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, some embodiments are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
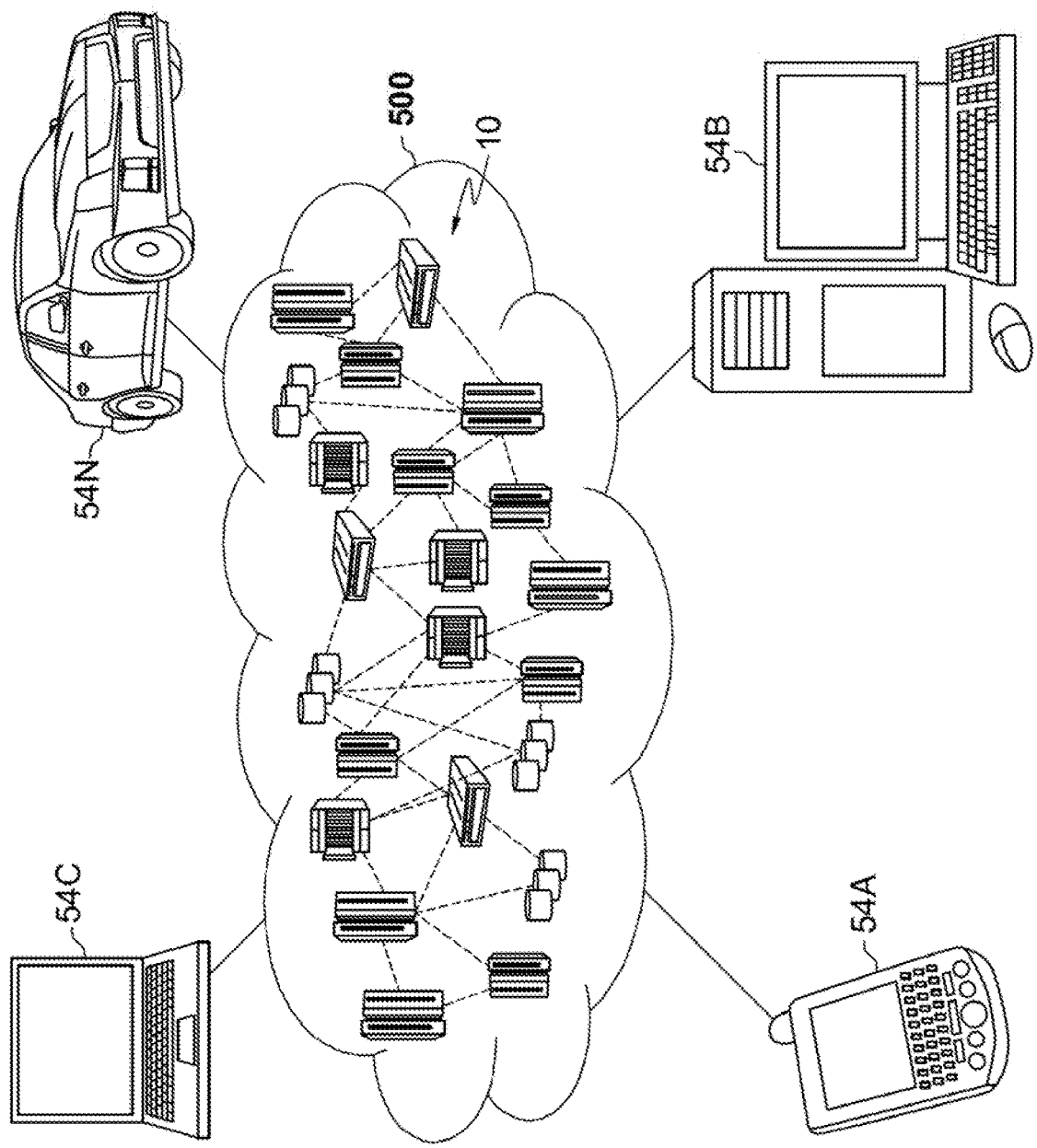
FIG. 5 is a block diagram of an illustrative cloud computing environment including the computer system depicted in FIG. 1, according to at least one embodiment.

Referring to FIG. 5, illustrative cloud computing environment 500 is depicted. As shown, cloud computing environment 500 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Cloud computing nodes 10 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 54A-N shown in FIG. 5 are intended to be illustrative only and that cloud computing nodes 10 and cloud computing environment 500 can communicate with any type of computerized device over any type of network and/or network addressable connection (e.g., using a web browser).

Figure 6:
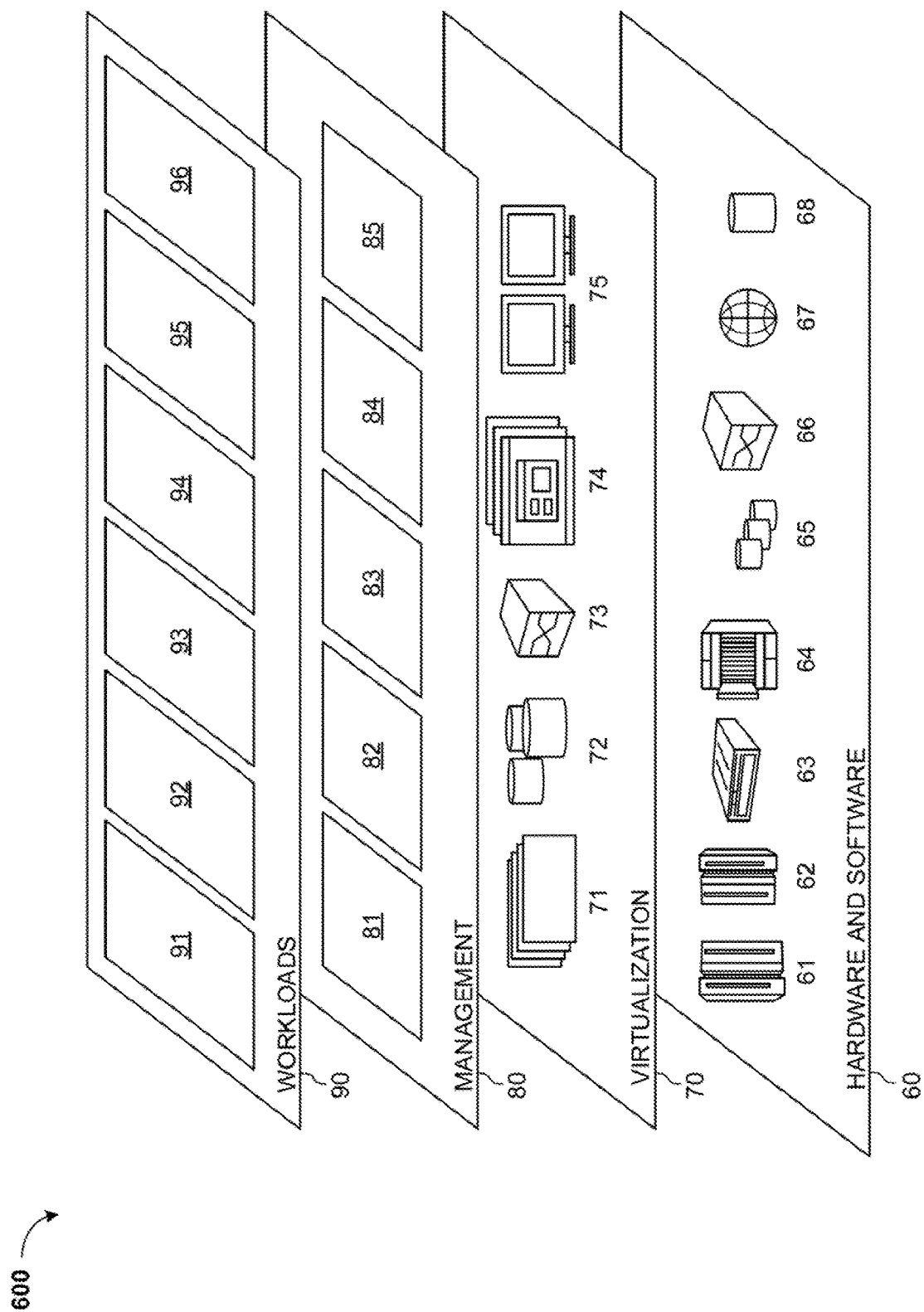
FIG. 6 is a block diagram of functional layers of the illustrative cloud computing environment of FIG. 5, according to at least one embodiment.

Referring to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below.

Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Session-Based DASH 96. Session-Based DASH 96 may signal for session-based dynamic adaptive streaming over HTTP.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for signaling for session-based dynamic adaptive streaming over HTTP (DASH), executable by a processor, comprising:
   setting multiple queries to one or more elements of a Media Presentation Description (MPD);
   checking for redundancy among values of the Session Based DASH (SBD) descriptors and based on determining which of levels, of an MPD hierarchical data model of the MPD, the SBD descriptors are respectively assigned, the values of each of the SBD descriptors define one or more URLs of an SBD file, one or more sets of keys, and default values of the keys;
   replacing redundant ones of the values of the SBD descriptors, prior to executing any query according to the SBD descriptors including the redundant ones, when building an SBD query, wherein one or more query descriptors are added at the one or more elements of the MPD and indicate a determined equivalency between the at least part of the multiple queries and the one or more query descriptors that are added at the one or more elements of the MPD; and
   streaming in SBD based on signaling in DASH according to the SBD query,
   wherein each of the SBD descriptors is a file providing instructions to make an MPD specific for a session of Session-Based DASH streaming, and
   wherein based on determining that ones of the SBD descriptors at least at two different ones of the levels of the MPD hierarchical data model comprise identical values @id attributes, further determining to add only key-value pairs defined by one of the ones of the SBD descriptors and of an element determined to be assigned at a lower hierarchical level, of the at least two different ones of the levels and as compared to another of the at least two different ones at which another of the ones of the SBD descriptors is determined to be assigned, are added to the multiple queries at a location of a query corresponding to a Session-Based DASH descriptor of an element at a higher hierarchical level of the at least two different ones of the levels.

2. The method of claim 1, wherein the at least part of the multiple queries is replaced based on allowing a client to choose among two or more queries from among the multiple queries.

3. The method of claim 1, wherein ones of the SBD descriptors appear at one or more of the levels of the MPD hierarchical data model.

4. The method of claim 3, wherein based on determining that two or more of the SBD descriptors are assigned at one MPD element, a DASH client processes only one of the descriptors.

5. The method of claim 1, wherein based on two or more of the SBD descriptors having different @id values, key-value pairs associated with the two or more of the SBD descriptors are added to the multiple queries in an order of appearance corresponding to the MPD hierarchical data model.

6. A computer system for signaling for session-based dynamic adaptive streaming over HTTP (DASH), the computer system comprising:
   one or more computer-readable non-transitory storage media configured to store computer program code; and
   one or more computer processors configured to access said computer program code and operate as instructed by said computer program code, said computer program code including:

setting code configured to cause the one or more computer processors to set multiple queries to one or more elements of a Media Presentation Description (MPD);

determining code configured to cause the one or more computer processors to check for redundancy among values of Session Based DASH (SBD) descriptors and determine which of levels, of an MPD hierarchical data model of the MPD, the SBD descriptors are respectively assigned, the values of each of the SBD descriptors define one or more URLs of an SBD file, one or more sets of keys, and default values of the keys;

replacing code configured to cause the one or more computer processors to replace redundant ones of the values of the SBD descriptors including the redundant ones, prior to executing any query according to the SBD descriptors, when building an SBD query, wherein one or more query descriptors are added at the one or more elements of the MPD and indicate a determined equivalency between the at least part of the multiple queries and the one or more query descriptors that are added at the one or more elements of the MPD; and signaling code configured to cause the one or more computer processors to stream in SBD based on signaling in DASH according to the SBD query, wherein each of the SBD descriptors is a file providing instructions to make an MPD specific for a session of Session-Based DASH streaming, and wherein based on determining that ones of the SBD descriptors at least at two different ones of the levels of the MPD hierarchical data model comprise identical values @id attributes, further determining to add only key-value pairs defined by one of the ones of the SBD descriptors and of an element determined to be assigned at a lower hierarchical level, of the at least two different ones of the levels and as compared to another of the at least two different ones at which another of the ones of the SBD descriptors is determined to be assigned, are added to the multiple queries at a location of a query corresponding to a Session-Based DASH descriptor of an element at a higher hierarchical level of the at least two different ones of the levels.

7. The computer system of claim 6, wherein the at least part of the multiple queries is replaced based on allowing a client to choose among two or more queries from among the multiple queries.

8. The computer system of claim 6, wherein ones of the SBD descriptors appear at one or more of the levels of the MPD hierarchical data model.

9. The computer system of claim 8, wherein based on determining that two or more of the SBD descriptors are assigned at one MPD element, a DASH client processes only one of the descriptors.

10. The computer system of claim 6, wherein based on two or more of the SBD descriptors having different @id values, key-value pairs associated with the two or more of the SBD descriptors are added to the multiple queries in an order of appearance corresponding to the MPD hierarchical data model.

11. A non-transitory computer readable medium having stored thereon a computer program for signaling for session-based dynamic adaptive streaming over HTTP (DASH), the computer program configured to cause one or more computer processors to:

set multiple queries to one or more elements of a Media Presentation Description (MPD);

check for redundancy among values of the SBD descriptors and determine which of levels, of an MPD hierarchical data model of the MPD, the SBD descriptors are respectively assigned, the values of each of the SBD descriptors define one or more URLs of an SBD file, one or more sets of keys, and default values of the keys; and replace redundant ones of the values of the SBD descriptors, prior to executing any query according to the SBD descriptors including the redundant ones, when building an SBD query, wherein one or more query descriptors are added at the one or more elements of the MPD and indicate a determined equivalency between the at least part of the multiple queries and the one or more query descriptors that are added at the one or more elements of the MPD; and streaming based on signaling in DASH according to the SBD query, wherein each of the SBD descriptors is a file providing instructions to make an MPD specific for a session of Session-Based DASH streaming, and wherein based on determining that ones of the SBD descriptors at least at two different ones of the levels of the MPD hierarchical data model comprise identical values @id attributes, further determining to add only key-value pairs defined by one of the ones of the SBD descriptors and of an element determined to be assigned at a lower hierarchical level, of the at least two different ones of the levels and as compared to another of the at least two different ones at which another of the ones of the SBD descriptors is determined to be assigned, are added to the multiple queries at a location of a query corresponding to a Session-Based DASH descriptor of an element at a higher hierarchical level of the at least two different ones of the levels.

12. The computer readable medium of claim 11, wherein ones of the SBD descriptors appear at one or more of the levels of the MPD hierarchical data model.

13. The computer readable medium of claim 11, wherein based on determining that two or more SBD descriptors are assigned at one MPD element, a DASH client processes only one of the descriptors.

14. The computer readable medium of claim 11, wherein based on two or more of the SBD descriptors having different @id values, key-value pairs associated with the two or more of the SBD descriptors are added to the multiple queries in an order of appearance corresponding to the MPD hierarchical data model.

* * * * *